United States Patent
Swanson et al.

(10) Patent No.: US 11,404,078 B1
(45) Date of Patent: Aug. 2, 2022

(54) MEASURING AMPLITUDES OF WRITTEN TRACKS IN A TAPE DRIVE TO DETERMINE ERRORS IN READ AND WRITE ELEMENTS IN THE TAPE DRIVE

(71) Applicant: INTERNATIONAL BUSINES MACHINES CORPORATION, Armonk, NY (US)

(72) Inventors: David Lee Swanson, Tucson, AZ (US); Ernest Stewart Gale, Tucson, AZ (US); Josephine Faith Bayang (Kubista), Tucson, AZ (US); Illarion Borisevich, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/401,290

(22) Filed: Aug. 12, 2021

(51) Int. Cl.
G11B 5/455 (2006.01)
G11B 5/596 (2006.01)
G11B 20/10 (2006.01)
G11B 5/09 (2006.01)

(52) U.S. Cl.
CPC ............ *G11B 5/59627* (2013.01); *G11B 5/09* (2013.01); *G11B 5/455* (2013.01); *G11B 20/10314* (2013.01)

(58) Field of Classification Search
None
See application file for complete search history.

(56) References Cited

U.S. PATENT DOCUMENTS

| | | | | |
|---|---|---|---|---|
| 5,235,478 A | * | 8/1993 | Hoshimi | G11B 5/5556 360/78.08 |
| 5,949,602 A | * | 9/1999 | Ishioka | G11B 5/5534 360/75 |
| 6,249,399 B1 | * | 6/2001 | Chainer | G01N 21/03 360/75 |
| 6,317,285 B1 | * | 11/2001 | Bi | G11B 5/5534 360/75 |
| 7,573,665 B2 | | 8/2009 | Eleftheriou et al. | |
| 8,154,811 B2 | * | 4/2012 | Barsotti | G11B 20/10009 360/31 |
| 8,665,563 B2 | | 3/2014 | Hostetter | |
| 8,824,083 B1 | | 9/2014 | Kientz et al. | |
| 10,600,433 B2 | | 3/2020 | Breuer et al. | |

(Continued)

*Primary Examiner* — Peter Vincent Agustin
(74) *Attorney, Agent, or Firm* — Konrad Raynes Davda & Victor LLP; David W. Victor (57) ABSTRACT

Provided are a tape drive, tape drive controller, and method for measuring amplitudes of written tracks to determine errors in read and write elements. The write element writes a data pattern and erase pattern to the tape medium to provide the data pattern and the erase pattern on sides of the data pattern. The read element is positioned to measure amplitudes at offsets in the data pattern. The offsets and the amplitudes at the offsets are processed to estimate a maximum amplitude read while the read element is estimated to be positioned entirely in the data pattern and estimate an offset at which the read element reads a fixed percentage of the maximum amplitude. A width of the read element is estimated based on the estimated offset. The estimated width of the read element is outputted to determine whether the estimated width of the read element is acceptable.

20 Claims, 8 Drawing Sheets

(56) References Cited

U.S. PATENT DOCUMENTS

2002/0050814 A1* 5/2002 Nozu ................ G01R 33/1207
324/210
2006/0092539 A1 5/2006 Berman et al.
2009/0244755 A1* 10/2009 Mochizuki ............ G11B 5/455
360/31
2010/0265612 A1 10/2010 Jaquette

* cited by examiner

MEASURING AMPLITUDES OF WRITTEN TRACKS IN A TAPE DRIVE TO DETERMINE ERRORS IN READ AND WRITE ELEMENTS IN THE TAPE DRIVE

BACKGROUND OF THE INVENTION

1. Field of the Invention

Provided are a tape drive, tape drive controller, and method for measuring amplitudes of written tracks in a tape drive to determine errors in read and write elements in the tape drive.

2. Description of the Related Art

In magnetic storage systems, data is read from and written onto magnetic recording media utilizing magnetic read and write elements formed on a tape head. Data is written on the magnetic recording media by moving a magnetic recording transducer to a position over the media where the data is to be stored. The magnetic recording transducer generates a magnetic field, which encodes the data into the magnetic media. Data is read from the media by similarly positioning the magnetic read element and then sensing the magnetic field of the magnetic media. Read and write operations may be independently synchronized with the movement of the media to ensure that the data can be read from and written to the desired location on the media.

In order for tape drive developers to determine whether a tape drive can correctly position written tracks of data on tape, the developer needs a precise understanding of the magnetic characteristics of all reading and writing elements on a tape head. Any discrepancy between the nominal, i.e., assumed, and actual length and centerline of these elements will contribute to misplacing data tracks when written on tape, which will necessarily reduce margins in that tape drive. This manifests as poorer read/write performance and/or requires a tighter servo tolerance to account for the reduced track placement precision.

The tape drive developer may determine errors in the tape drive by reading a test pattern at different offsets from the centerline to measure the amplitude of the read signal at different offsets to generate a profile of the offsets and amplitudes. If the read elements are operating and designed properly, then the resulting profile of the offsets and amplitudes read at the offsets may appear as a bathtub shaped curve.

The results from this calibration can be used to characterize and/or disposition a drive. For instance, if the writers are damaged by corrosion then its width may appear shortened and/or the centerline is shifted. Also, the reader-to-writer offset will likely have a linear trend line as one moves from the top of the head module to the bottom. The slope of this trendline can be used to correlate the perceived tape dimensional stability (TDS) effects between reader and writer modules that the servo code measures. Tape Dimensional Stability (TDS) is a measure of the positional stability of the magnetic data tracks relative to each other and is a function of the tape properties and environmental effects such as temperature, humidity, tension, creep, etc. This measurement can be used in conjunction with the writer offset calibration to improve the track placement.

There is a need in the art for an improvement for determining and using measured amplitudes at offsets of a read element in the written track to use during development and manufacturing of the read and write elements.

SUMMARY

Provided are a tape drive, tape drive controller, and method for measuring amplitudes of written tracks in a tape drive to determine errors in read and write elements in the tape drive The write element writes a data pattern and erase pattern to the tape medium to provide the data pattern and the erase pattern on sides of the data pattern. The read element is positioned to measure amplitudes at offsets in the data pattern. The offsets and the amplitudes at the offsets are processed to estimate a maximum amplitude read while the read element is estimated to be positioned entirely in the data pattern and estimate an offset at which the read element reads a fixed percentage of the maximum amplitude. A width of the read element is estimated based on the estimated offset. The estimated width of the read element is outputted to determine whether the estimated width of the read element is acceptable.

DETAILED DESCRIPTION

When measuring the amplitude of a read element at offsets within a written track, the maximum amplitude signal is measured when the read element is positioned completely within the written track. As the read elements moves incrementally offtrack, i.e., partially positioned within an erase region on a side of the written data pattern, then the measured amplitude will decrease. A large dataset of amplitudes versus positional offsets are collected to generate a "bathtub curve" that demonstrates the contour of the magnetic interaction between read and write elements.

Described embodiments provide improved techniques for measuring an amplitude profile and bathtub curve from the read elements that are deployed in the tape drive to use during development of the tape drive or manufacturing to determine an error in the widths of the read and write elements demonstrated from the measured bathtub curve. Using the bathtub curve, the tape drive can compute a fair estimation of the width of the read and write elements. A plateau at the top of the curve is a representation of the amplitudes measured while the reader moves entirely within the region of the written track. As a portion of the read element moves off the written track, into the erase region, the amplitude will decrease to form slopes at the left and right sides of the bathtub curve. Described embodiments further provide improved techniques to use the estimated widths of the read and write elements, and the slopes of the sides of the bathtub curve to estimate errors and determine whether the tape drive should be rejected or approved during development or manufacturing.

Figure 1:
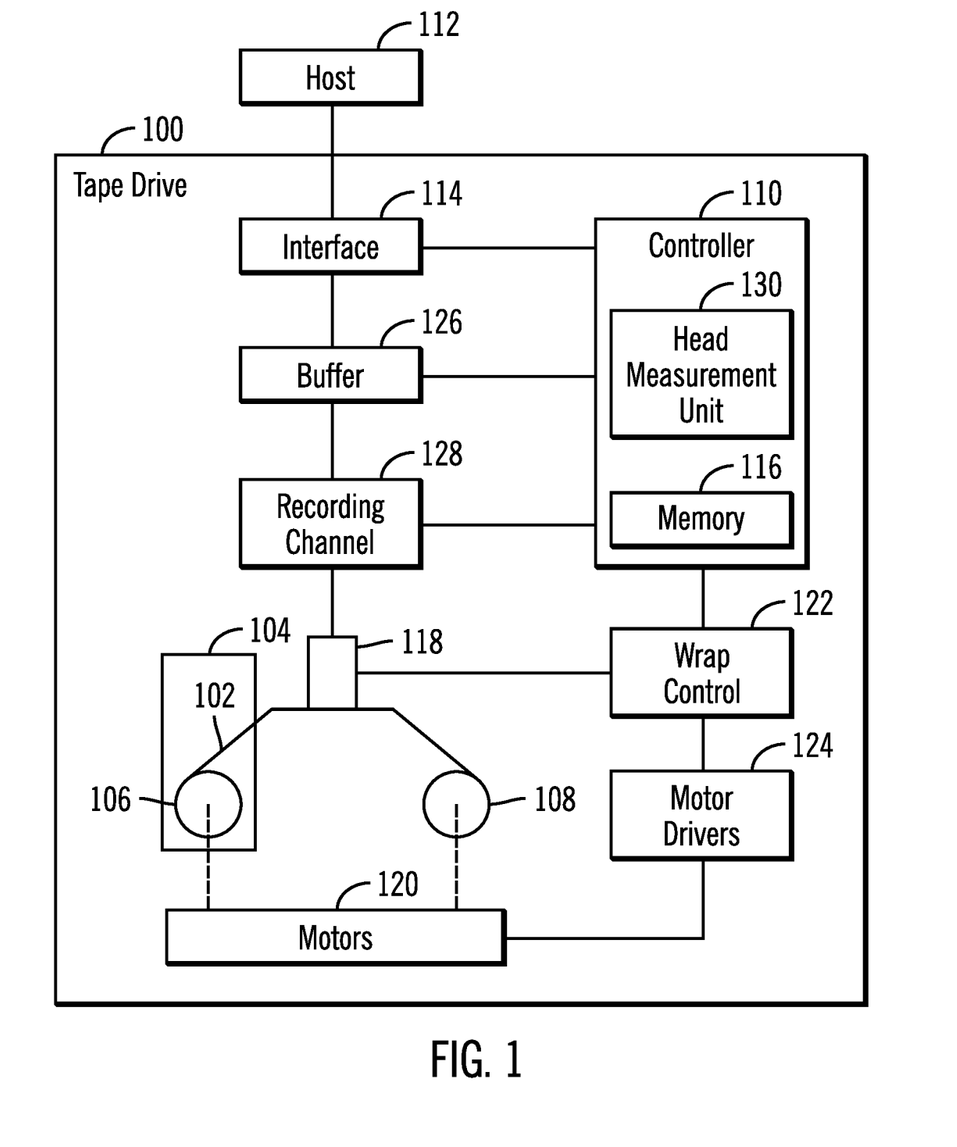
FIG. 1 illustrates an embodiment of a tape drive system in which embodiments are implemented.

FIG. 1 illustrates an embodiment of a tape drive 100 to read and write with respect to a magnetic tape 102 of a magnetic tape cartridge 104. The magnetic tape cartridge 104 comprises a length of magnetic tape 102 wound on one or two reels 106, 108. By way of example, the magnetic tape cartridge 102 may comprise a single reel tape, such as adhering to the Linear Tape Open (LTO) format. An example of a tape drive 10 is the IBM TS2280 Tape Drive based on LTO Ultrium 8 technology, and other Ultrium type tape drives. Other implementations of the tape cartridge 102 and tape drive may also be used.

The tape drive 100 may further include one or more controllers 110 to operate the tape drive 100 in accordance with commands received from a host system 112 received at an interface 114. The controller 110 includes logic and/or one or more microprocessors with a memory 116 for storing information and program information for operating the microprocessor(s). The tape drive 100 may comprise a standalone unit or comprise a part of a tape library or other subsystem. The tape drive 100 may be coupled to the host system 112 directly, through a library, or over a network, and employ at interface 14 a Small Computer Systems Interface (SCSI), an optical fiber channel interface, etc.

The tape cartridge 104 may be inserted in the tape drive 100, and loaded by the tape drive 100 mechanisms so that one or more read and/or write elements on a tape head 118 reads and/or writes information in the form of signals with respect to the magnetic tape 104 as the tape is moved longitudinally by one or more motors 120 which rotate the reels 106, 108. The magnetic tape typically comprises a plurality of parallel tracks, or groups of tracks. In some formats, such as the LTO format, above, the tracks are arranged in a serpentine back and forth pattern of separate wraps, as is known to those of skill in the art.

The recording system may comprise a wrap control system 122 to electronically switch to another set of read and/or write elements on the tape head 118, and/or to seek and move the tape head 118 laterally on the tape 102, to position the read and write elements at a desired wrap or wraps, and to track follow the desired wrap or wraps. The wrap control system 122 may also control the operation of the motors 120 through motor drivers 124 and in response to instructions from the controller 110.

The controller 110 also provides the data flow and formatter for data to be read from and written to the tape, employing a buffer 126 and a recording channel 128. The controller 110 includes a head measurement unit 130 to measure offsets and amplitudes at read elements on the tape head 118 for purposes of measuring a width of the read and write elements to determine whether the read and write elements satisfy various specifications and expectations, and to determine whether errors are experienced in measuring amplitudes and offsets. The head measurement unit 130 may measure the widths of the read and write elements during development of the tape drive 100 and/or during quality assurance testing of the tape drive 100 during manufacturing. The head measurement unit 130 captures signal amplitudes measured from the read elements on the tape head 118 from a readback of a signal pattern on the tape 104 at an offset at which the read elements are positioned from a centerline of the written track. The amplitude may be measured from the servo offset position.

The controller 110 may comprise program code in the memory 116 that is loaded into a processor and executed to perform the tape drive and head measurement unit 130 operations. Alternatively, some or all of the functions of the controller 110 and head measurement unit 130 may be implemented as microcode or firmware in hardware devices in the tape drive 100, such as in Application Specific Integrated Circuits (ASICs). The memory 116 may comprise a suitable volatile or non-volatile memory device known in the art.

Figure 2:
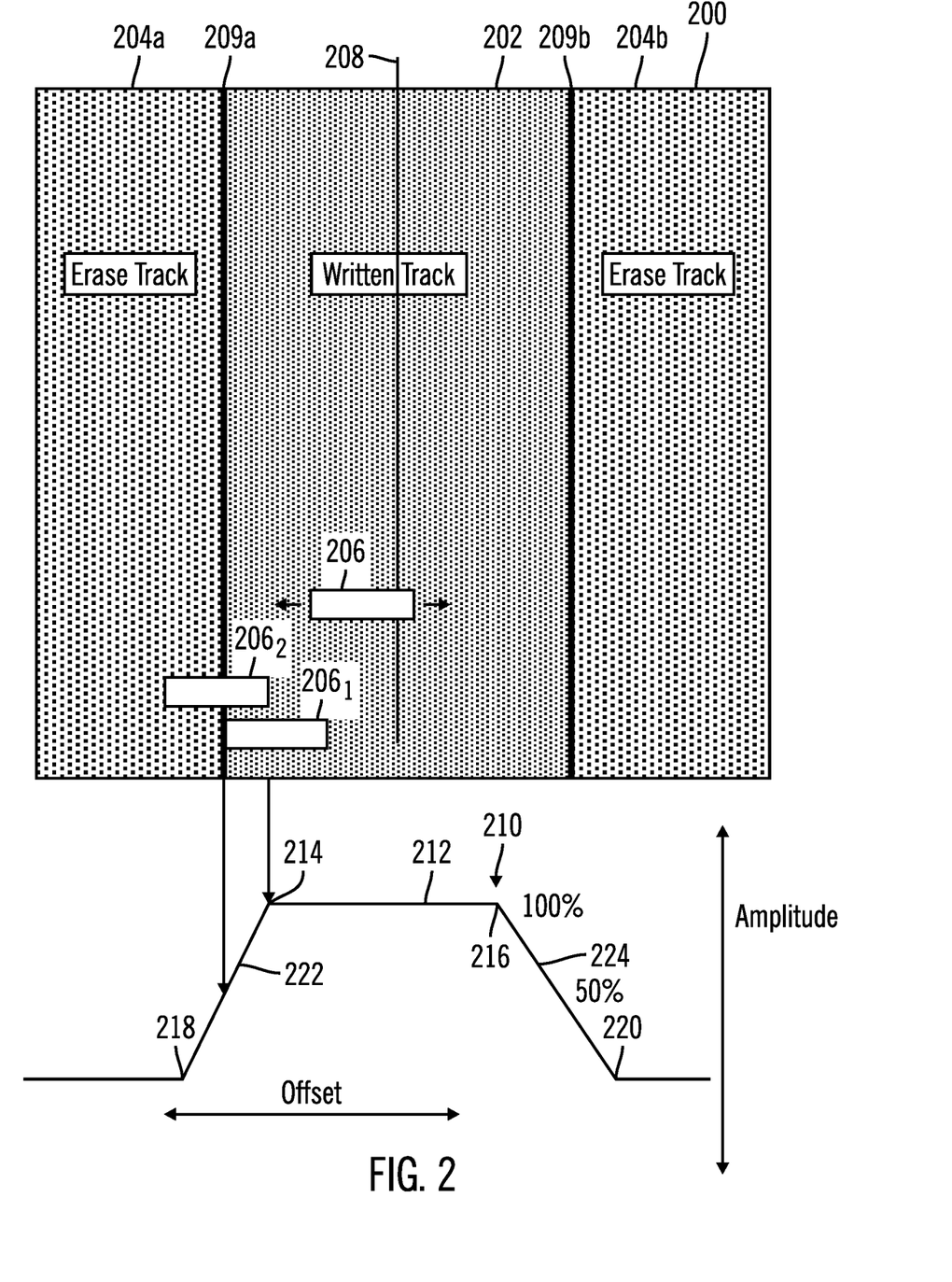
FIGS. 2 and 3 illustrate embodiments of a written track for purposes of measuring amplitudes at offsets from a centerline of a data pattern of the written track.

FIG. 2 illustrates a diagram showing a tape medium 200, such as tape 104, having a written track 202 having a data pattern with erase tracks 204a, 204b comprising erase patterns written on sides of the written track. In FIG. 2, the track 202 and erase patterns 204a, 204b form an unshingled pattern with a written track having a same width as the write element, such as by erasing track n, erasing track n+4, and writing a fixed pattern or data pattern on wrap n+2. A reader 206 is shown in different offsets 2061, 2062 as it moves laterally from a centerline 208 to the edges 209a, 209b of the written track 202.

While the read element 206 is positioned entirely in the written track 202, the amplitude would be measured as a maximum amplitude 212 or 100% as shown on the bathtub curve 210, which shows amplitudes (y-axis) at different offsets (x-axis). As the read element 2062 moves to offsets outward from the edges of the write track 202, the amplitude would decrease from the maximum read amplitude 212 as the read element 2062 is partially positioned in the erase track 204a, 204b. At the offsets 218, 220, when the read element 206 is entirely positioned in the erase track 204a, 204b, the amplitude would be zero. Further at a 50% of maximum amplitude 212, shown at offsets 222 and 224, the read element 206 is at an offset 2062 such that half the read element 206 is within the erase pattern 204a and the other half within the written track 202.

Figure 3:
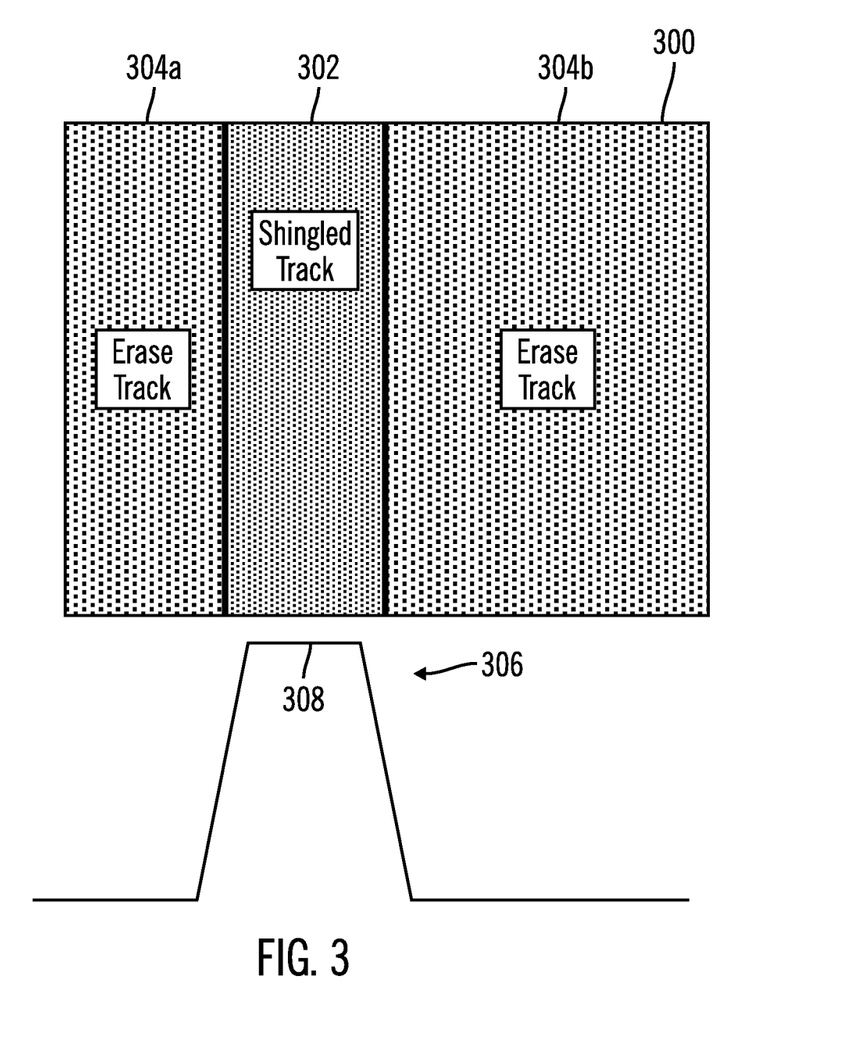

FIG. 3 illustrates a diagram showing a tape medium 300, such as tape 104, having a written track 302 comprised of a data pattern with erase tracks 304a, 304b comprised of erase patterns on sides of the written track 202, written in a shingled pattern. A shingled pattern may be written by each write element erasing track n, writing the pattern on wrap n+2, then erase wrap n+4 to yield a single shingled track. A bathtub curve 306 is shown with an amplitude plateau 308 of a maximum amplitude read while the read element is positioned entirely within the shingled track. As with FIG. 2, the amplitude decreases as the read element is not positioned entirely within the written track 302.

In certain embodiments, the tape head 118 may have multiple write elements, such as 32 write elements, to write tracks in channels and corresponding read elements to read the written data in the channels. In this way the shingled and unshingled patterns are written in each channel for each of the multiple read and write elements on a tape head 118.

Figure 4:
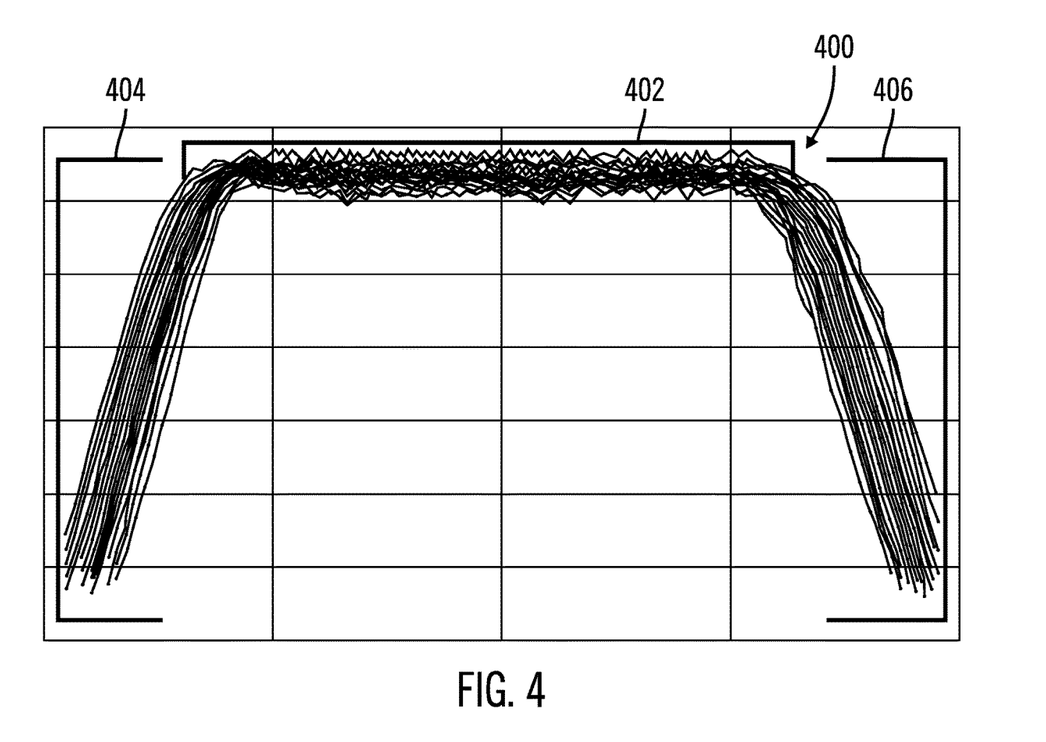
FIG. 4 illustrates an embodiment of a profile of amplitudes measured at offsets of the read elements on a tape head when reading the encoded signals in the written track.

FIG. 4 illustrates an example of multiple bathtub curves 400 generated by a read test of the written tracks in each of the channels by repeatedly measuring with the read elements on the tape head 118 amplitudes while reading each of the written data tracks by the respective read elements at positions farther and farther away from the nominal center positions until the outside "bathtub" edges of each written data track are identified. The plateau 402 of the bathtub curves 400 comprises the range where the maximum amplitude is measured while the read element 206 is positioned entirely in the write track 202. As the read element 2062 is positioned in the erase area 204a, the measured amplitude in the curves 400 slopes downward 404, 406 as the amplitude decreases.

Figure 5A:
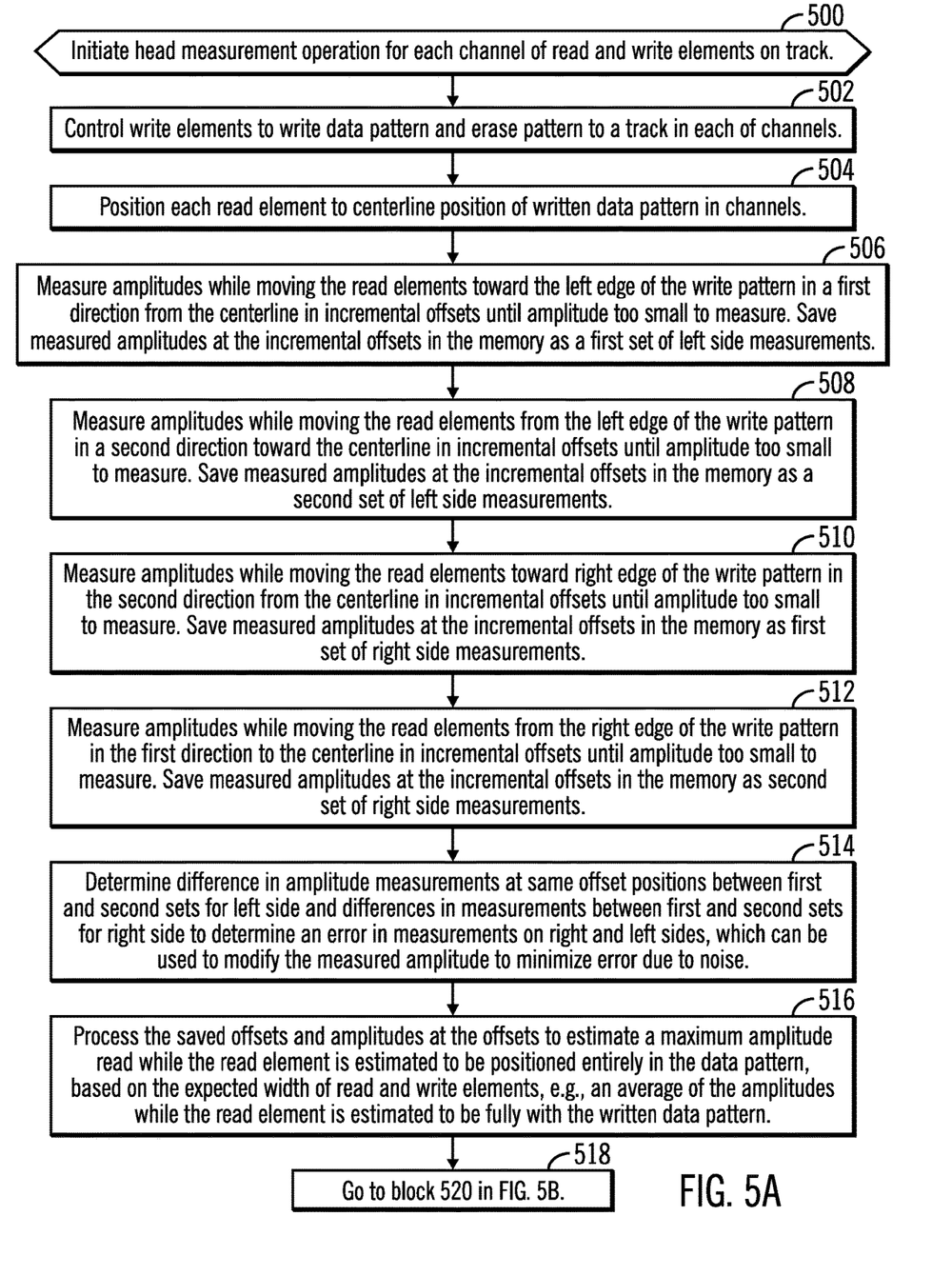
FIGS. 5a and 5b illustrate an embodiment of operations to measure amplitudes at offsets of the read elements and estimate a width of the read and write elements on the tape head.
Figure 5B:
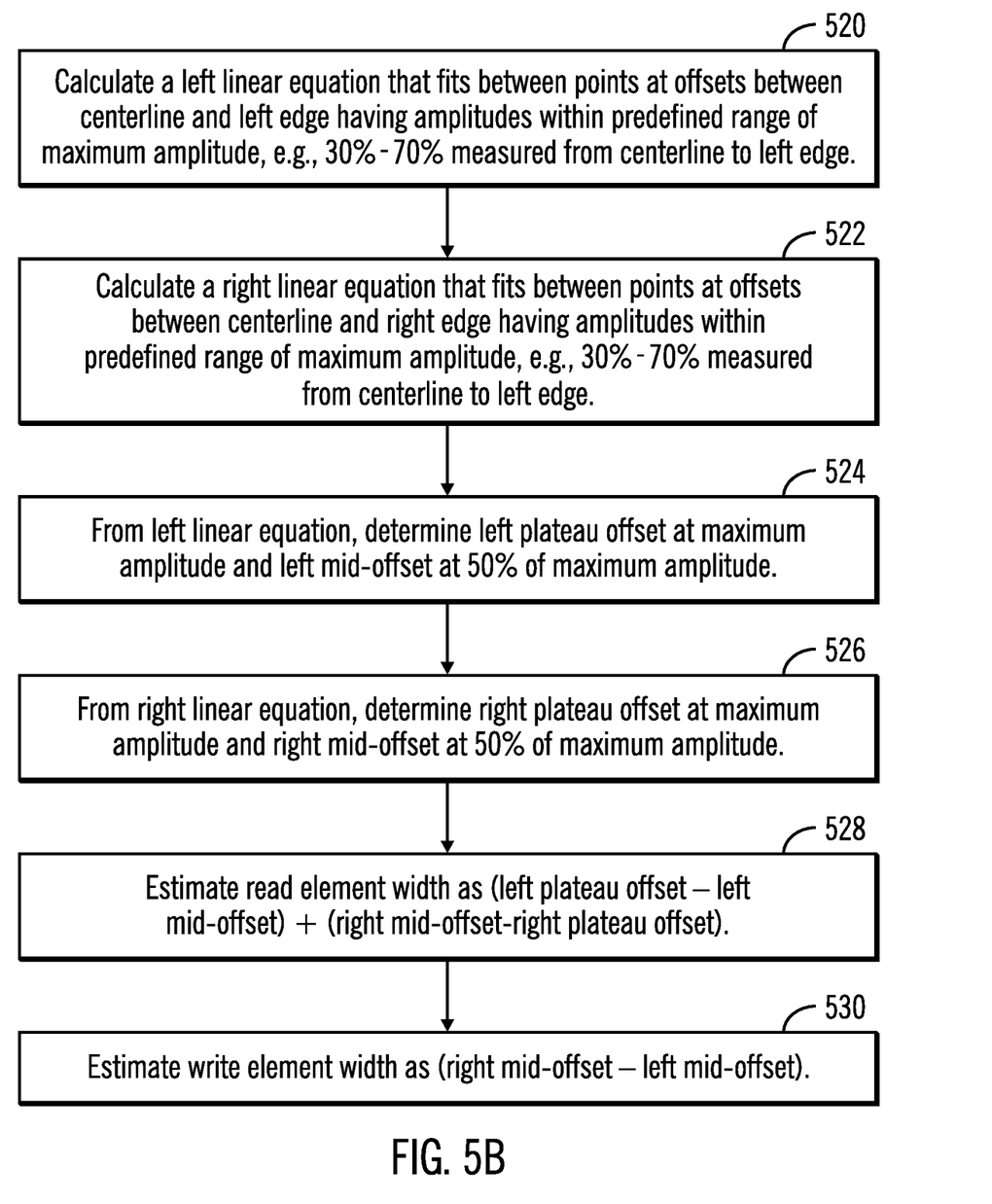

FIGS. 5a and 5b illustrate an embodiment of operations performed by the head measurement unit 130 to estimate the read and write element widths. This operation may be performed for multiple read and write elements in different channels on the tape head 118 to measure the read and write elements in each of the channels. Upon initiating (at block 500) read and write element measurement operations, the head measurement unit 130 controls the write elements to write (at block 502) a data pattern and erase pattern to a track in each of the channels. Each read element is positioned (at block 504) in a centerline position 208 (FIG. 2) of the written track 202 in the channels. Amplitudes are measured (at block 506) while moving the read elements on the tape head 118 toward the left edge 209a (FIG. 2) of the write pattern 202 in a first direction from the centerline 208 in incremental offsets until the amplitudes in all the channels are too small to measure, e.g., zero or close to zero amplitude. The measured amplitudes and offsets are saved in the memory 116 for a first set of left side measurements. Measurements may be taken for all the read elements on the tape head 118 in all the channels. Amplitudes are measured (at block 508) while moving the read elements from the left edge 209a of the write pattern 202 in a second direction toward the centerline 208 in incremental offsets until the amplitude is too small to measure. The measured amplitudes and the offsets are saved in the memory 116 as a second set of left side measurements. Amplitudes are measured (at block 510) while moving the read elements toward right edge 209b of the write pattern in the second direction from the centerline in incremental offsets until the amplitude is too small to measure. The measured amplitudes and the offsets are saved in the memory 116 as a first set of right side measurements. Amplitudes are measured (at block 512) while moving the read elements from the right edge 209b of the write pattern in the first direction to the centerline 208 in incremental offsets until the amplitude is too small to measure. The measured amplitudes and offsets are saved in the memory 116 as a second set of right side measurements.

The head measurement unit 130 may then determine (at block 514) differences in amplitude measurements at same offset positions between first and second sets for left side and differences in measurements between first and second sets for right side to determine an error in measurements at same offsets on right and left sides. These errors can be used to modify the measured amplitude to minimize error due to noise. The head measurement unit 130 may further process (at block 516) the saved offsets and amplitudes at the offsets to estimate a maximum amplitude read while the read element is estimated to be positioned entirely in the write pattern 202, based on the expected width of read and write elements, e.g., an average of the amplitudes while the read element is estimated to be fully with the written data pattern 202, shown as the plateau 402 in FIG. 4. In this way, the amplitudes are measured while the read elements are estimated to be within the written track based on the specification for the read and write elements. Control then proceeds to block 520 in FIG. 5b to measure the read and write element width.

With respect to FIG. 5b, the head measurement unit 130 calculates (at block 520) a left linear equation that fits between points at offsets between centerline and left edge having amplitudes within predefined range of the maximum amplitude, e.g., 30%-70% measured from centerline to the left edge. The head measurement unit 130 further calculates (at block 522) a right linear equation that fits between points at offsets between centerline and right edge having amplitudes within predefined range of maximum amplitude, e.g., 30%-70% measured from centerline to left edge. From the left linear equation, a determination is made (at block 524) of a left plateau offset 214 (FIG. 2) at the maximum amplitude 212 and left mid-offset 222 at 50% of the maximum amplitude 212. From the right linear equation, a determination is made (at block 526) of right plateau offset 216 at the maximum amplitude 212 and a right mid-offset 224 at 50% of maximum amplitude 212.

The head measurement unit 130 may then estimate (at block 528) the read element width as the (left plateau offset 214 minus left mid-offset 222) plus the (right mid-offset 224 minus right plateau offset 216). The difference of the plateau offset 214, 216 and mid-offset 222, 224 are each half the estimated width of the read element 2062 while halfway positioned in the write track 202 and erase track 204a, 204b. Thus, adding the measured right and left sides adds the two halves of the read element estimated from the offsets and amplitudes gathered from the right and left sides of the written track 202. The write element width may then be estimated (at block 530) as the right mid-offset 224 minus the left mid-offset 222.

With the embodiment of FIGS. 5a and 5b, the head measurement unit 130 uses measured amplitudes and offsets on both sides of the centerline 208 of the write track 202 to determine left and right linear equations of the bathtub curve of the amplitude profile gathered by the read elements on the tape head 118. This allows for an empirical independent measurement of the read and write elements based on the geometry of the written track and amplitudes measured at different offsets of the read element on both sides of the centerline 208 of the written track 202 in all of the channels.

Figure 6:
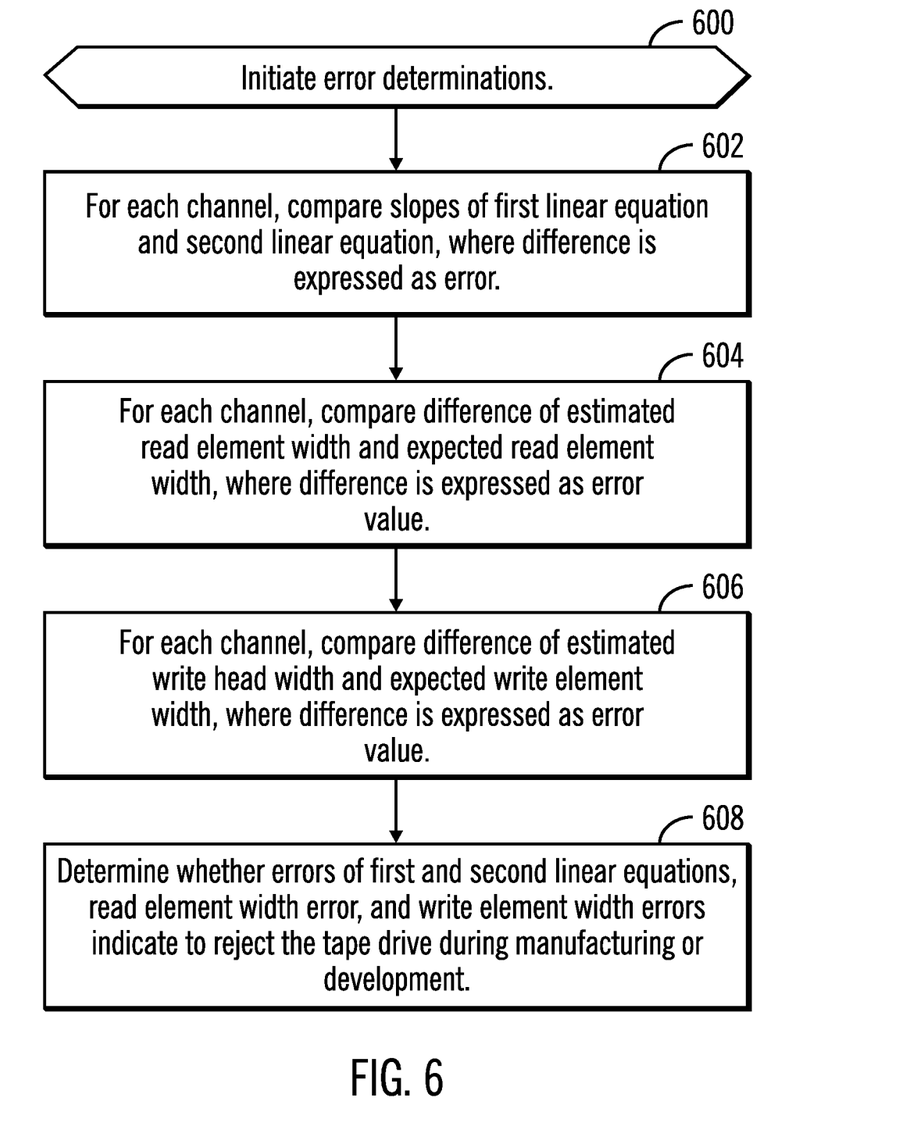
FIG. 6 illustrates an embodiment of operations to determine errors in the measured widths of the read and write elements.

FIG. 6 illustrates an embodiment of operations performed by the head measurement unit 130 to calculate errors based on the read and write elements calculated based on the amplitudes measured at offsets by the read elements in the channels. These determinations may be made during the tape drive 100 development phase to test the read and write elements formed on the tape heads 118 or during a quality assurance phase during manufacturing to determine the measured read and write element widths satisfy the specifications set for the read and write elements. Upon initiating (at block 600) error determinations, for each channel, the head measurement unit 130 compares (at block 602) slopes of the first linear equation (left side) and second linear equation (right side), to determine a difference, which may be expressed as an error. If the error is consistent across channels, then that means there may be a consistent defect in the read elements that are not consistently reading amplitudes at the same offsets on different sides of the written track 202.

For each channel, the estimated read element width and expected read element width according to manufacturing specifications are compared (at block 604) to determine an error in each channel. Consistent significant differences in each channel may indicate that the read elements were not manufactured consistently according to specifications. Significant differences measured in only a few channels may indicate a measurement error.

For each channel, the estimated write element width and read element width according to manufacturing specifications are compared (at block 606) to determine an error in each channel. Consistent significant differences in each channel may indicate that the write element elements were not manufactured consistently according to specifications. Significant differences measured in only a few channels may indicate a measurement error.

The head measurement unit 130 may then determine (at block 608) whether errors of first and second linear equations, read element width errors, and write element width errors indicate to reject the tape drive during manufacturing or development. The head measurement unit 130 may determine whether errors are consistently measured in all channels, which may indicate a systemic manufacturing error in forming the tape and write elements on the tape head 118. This information may then be outputted to allow the manufacturer to reject a tape drive 100 as defective or used by developers to determine whether adjustments need to be made to the manufacturing process or elements and components used.

Figure 7:
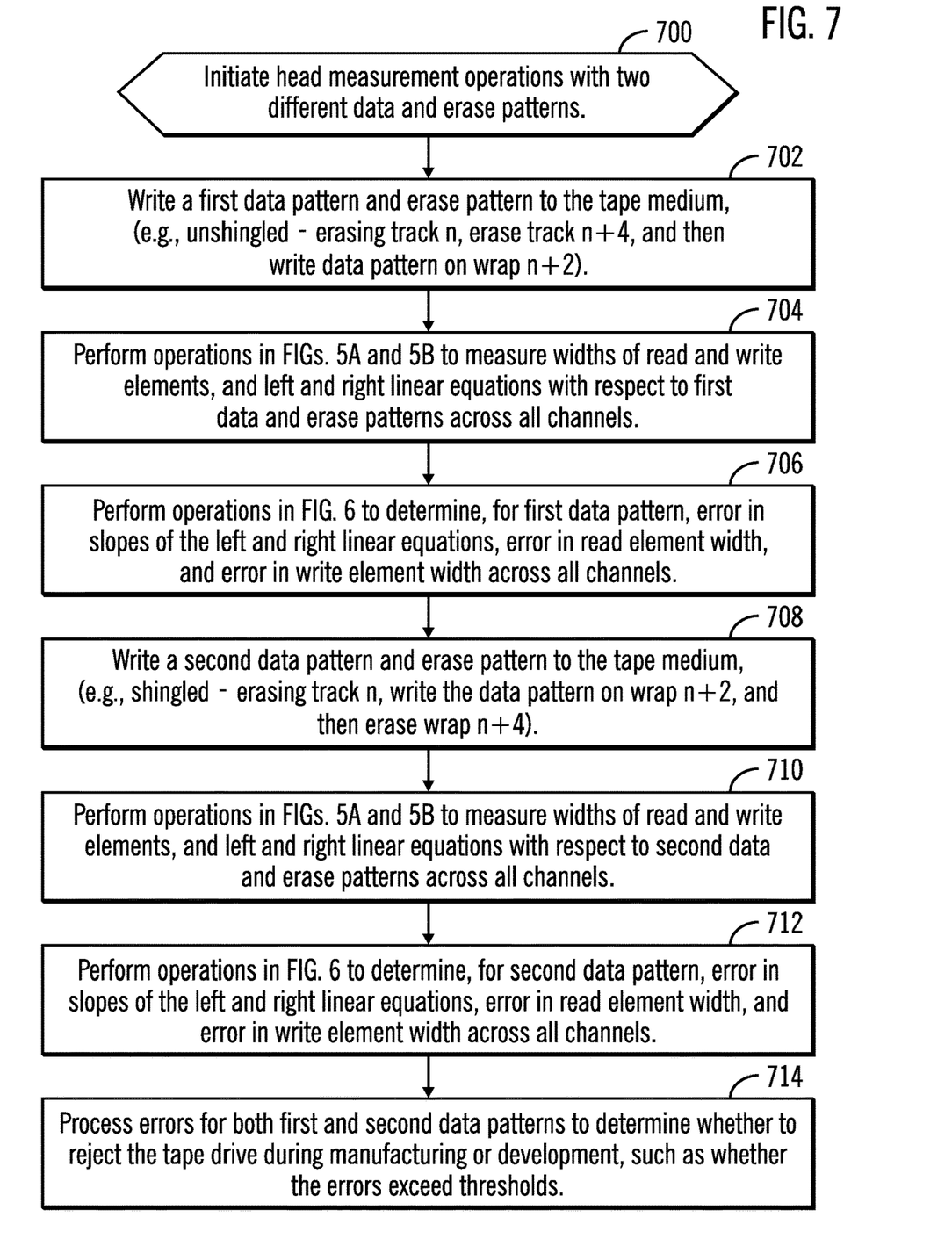
FIG. 7 illustrates an embodiment of operations to measure amplitudes at offsets of the read elements and estimate a width of the read and write elements on the tape head using two different data and erase patterns.

FIG. 7 illustrates an embodiment of operations performed by the head measurement unit 130 to perform the measurement and estimation operations for the read and write elements using two different data (write) patterns and erase patterns. Upon initiating (at block 700) head measurements, the head measurement unit 130 controls the tape head 118 write elements in the channels to write (at block 702) a first data pattern and erase pattern to the tape 102. In one embodiment, the first data and erase patterns may be written in an unshingled pattern, such as erasing track n, erase track n+4, and then write data pattern on wrap n+2, where n is a variable indicating a starting track number. The head measurement unit 130 may then perform (at block 704) the operations in FIGS. 5a and 5b to measure the widths of read and write elements, and left and right linear equations with respect to the first data and erase patterns, e.g., unshingled, across all channels. The head measurement unit 130 may then perform (at block 706) operations in FIG. 6 to determine, for the first data pattern, error in slopes of the left and right linear equations, error in read element width, and error in write element width across all channels.

The head measurement unit 130 may then control the tape head 118 to write (at block 708) a second data pattern and erase pattern to the tape 102. In one embodiment, the second data and erase patterns may be written in a shingled pattern, such as erasing track n, write the data pattern on wrap n+2, and then erase wrap n+4. The head measurement unit 130 may then perform (at block 710) the operations in FIGS. 5a and 5b to measure the width of the read and write elements, and left and right linear equations with respect to the first data and erase patterns, e.g., unshingled, across all channels. The head measurement unit 130 may then perform (at block 712) the operations in FIG. 6 to determine, for second data pattern, error in slopes of the left and right linear equations, error in read element width, and error in write element width across all channels.

The head measurement unit 130 may then process (at block 714) the errors for both first and second data patterns to determine whether to reject the tape drive during manufacturing or development, such as whether the errors exceed thresholds.

With the embodiment of FIG. 7, the head measurement unit 130 may perform the amplitude measurement operations to different write and erase patterns, such as shingled and unshingled, to then allow comparisons of the calculations, to determine whether estimated errors in the slopes, read element widths, and write element widths are systemic across channels and write patterns so as to indicate errors in manufacturing or development of the tape drive 100. Inconsistent error determinations from the different write patterns in different channels may indicate errors in the measurement process to require retesting.

The present invention may be a system, a method, and/or a computer program product implemented in the controller 110. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the described embodiment, variables i, n, etc., when used with different elements may denote a same or different instance of that element.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape drive for performing read and write operations with respect to a tape medium, comprising:
   a controller for controlling a tape head having a read element and a write element to perform:
      writing, by the write element, a data pattern and erase pattern to the tape medium to provide the data pattern and the erase pattern on sides of the data pattern;
      positioning the read element to measure amplitudes at offsets in the data pattern;
      processing the offsets and the amplitudes at the offsets to estimate a maximum amplitude read while the read element is estimated to be positioned entirely in the data pattern and estimate an offset at which the read element reads a fixed percentage of the maximum amplitude;

estimating a width of the read element based on the estimated offset; and outputting the estimated width of the read element to determine whether the estimated width of the read element is acceptable.

2. The tape drive of claim 1, wherein the positioning the read element to measure the amplitudes comprises:

moving the read element in incremental offsets away from a centerline of the data pattern toward a first edge of the data pattern to measure amplitudes on a first side of the data pattern between the centerline and a first edge of the data pattern; and moving the read element in incremental offsets away from the centerline toward a second edge of the data pattern to measure amplitudes on second side of the data pattern between the centerline and the second edge of the data pattern.

3. The tape drive of claim 2, wherein the estimating the offset comprises estimating a first offset, wherein the offsets and amplitudes are processed by:

processing the offsets and the amplitudes gathered on the first side of the data pattern within a predefined range of the maximum amplitude to fit a first linear equation to the offsets and amplitudes, wherein the estimating the first offset at which the read element measures a fixed percentage of the maximum amplitude comprises using the first linear equation to estimate the first offset at the fixed percentage of the amplitude;

processing the offsets and the amplitudes gathered on the second side of the data pattern within the predefined range of the maximum amplitude to fit a second linear equation to the offsets and amplitudes; and using the second linear equation to estimate a second offset at the fixed percentage of the amplitude, wherein the width of the read element is estimated using the first and the second offsets.

4. The tape drive of claim 3, wherein the estimating the width of the read element using the first and the second offsets comprises:

using the first linear equation to estimate a first plateau offset at the maximum amplitude; and using the second linear equation to estimate a second plateau offset at the maximum amplitude, wherein the estimated width of the read element comprises the (first plateau offset minus the first offset) plus (first second offset minus the second offset).

5. The tape drive of claim 1, wherein the fixed percentage comprises 50%.

6. The tape drive of claim 1, wherein the tape head includes a plurality of read elements and a plurality of write elements to write data in a plurality of channels on the tape medium, wherein the writing the data pattern and the erase pattern is performed by the plurality of write elements in the plurality of channels, wherein the positioning the read element to measure the amplitudes at different offsets comprises positioning the plurality of read elements to measure amplitudes in the plurality of channels, wherein the processing the offsets and amplitudes is performed to estimate maximum amplitudes and estimated offsets in the plurality of channels, and widths of the read elements are estimated from the estimated maximum amplitudes and the estimated offsets.

7. The tape drive of claim 1, wherein the data pattern comprises a first data pattern, the erase pattern a first erase pattern, the estimated width of the read element comprises a first width of the read element, wherein the controller further performs:

writing, by the write element, a second data pattern and second erase pattern to the tape medium to provide the second erase pattern on sides of the second data pattern;

positioning the read element to measure amplitudes at offsets in the second data pattern; and processing the amplitudes and the offsets measured in the second data pattern to estimate a second width of the read element, wherein the outputting the estimated with comprises outputting the first width and the second width of the read element to use to determine whether the read element is acceptable.

8. The tape drive of claim 7, wherein the first data pattern comprises an unshingled data pattern and wherein the second data pattern comprises a shingled data pattern.

9. The tape drive of claim 8, wherein the writing the unshingled data pattern comprises erasing track n, erase track n+4, and then write the first data pattern on wrap n+2, and wherein the writing the shingled data pattern comprises erasing track n, write the second data pattern on wrap n+2, and then erase wrap n+4.

10. A controller deployed in a tape drive having a tape head having a read element and a write element to perform read and write operations with respect to a tape medium, comprising:

a controller component; and a memory;

wherein the controller component performs operations, the operations comprising:

writing, by the write element, a data pattern and erase pattern to the tape medium to provide the data pattern and the erase pattern on sides of the data pattern;

positioning the read element to measure amplitudes at offsets in the data pattern stored in the memory;

processing the offsets and the amplitudes at the offsets to estimate a maximum amplitude read while the read element is estimated to be positioned entirely in the data pattern and estimate an offset at which the read element reads a fixed percentage of the maximum amplitude;

estimating a width of the read element based on the estimated offset; and outputting the estimated width of the read element to determine whether the estimated width of the read element is acceptable.

11. The controller of claim 10, wherein the positioning the read element to measure the amplitudes comprises:

moving the read element in incremental offsets away from a centerline of the data pattern toward a first edge of the data pattern to measure amplitudes on a first side of the data pattern between the centerline and a first edge of the data pattern; and moving the read element in incremental offsets away from the centerline toward a second edge of the data pattern to measure amplitudes on second side of the data pattern between the centerline and the second edge of the data pattern.

12. The controller of claim 11, wherein the estimating the offset comprises estimating a first offset, wherein the offsets and amplitudes are processed by:

processing the offsets and the amplitudes gathered on the first side of the data pattern within a predefined range of the maximum amplitude to fit a first linear equation to the offsets and amplitudes, wherein the estimating the first offset at which the read element measures a fixed percentage of the maximum amplitude comprises using the first linear equation to estimate the first offset at the fixed percentage of the amplitude;

processing the offsets and the amplitudes gathered on the second side of the data pattern within the predefined range of the maximum amplitude to fit a second linear equation to the offsets and amplitudes; and using the second linear equation to estimate a second offset at the fixed percentage of the amplitude, wherein the width of the read element is estimated using the first and the second offsets.

13. The controller of claim 12, wherein the estimating the width of the read element using the first and the second offsets comprises:

using the first linear equation to estimate a first plateau offset at the maximum amplitude; and using the second linear equation to estimate a second plateau offset at the maximum amplitude, wherein the estimated width of the read element comprises the (first plateau offset minus the first offset) plus (first second offset minus the second offset).

14. The controller of claim 10, wherein the data pattern comprises a first data pattern, the erase pattern a first erase pattern, the estimated width of the read element comprises a first width of the read element, wherein the controller component further performs:

writing, by the write element, a second data pattern and second erase pattern to the tape medium to provide the second erase pattern on sides of the second data pattern;

positioning the read element to measure amplitudes at offsets in the second data pattern; and processing the amplitudes and the offsets measured in the second data pattern to estimate a second width of the read element, wherein the outputting the estimated with comprises outputting the first width and the second width of the read element to use to determine whether the read element is acceptable.

15. The controller of claim 14, wherein the first data pattern comprises an unshingled data pattern and wherein the second data pattern comprises a shingled data pattern.

16. A method for controlling a tape head having a read element and a write element in a tape drive to perform read and write operations with respect to a tape medium, comprising:

writing, by the write element, a data pattern and erase pattern to the tape medium to provide the data pattern and the erase pattern on sides of the data pattern;

positioning the read element to measure amplitudes at offsets in the data pattern;

processing the offsets and the amplitudes at the offsets to estimate a maximum amplitude read while the read element is estimated to be positioned entirely in the data pattern and estimate an offset at which the read element reads a fixed percentage of the maximum amplitude;

estimating a width of the read element based on the estimated offset; and outputting the estimated width of the read element to determine whether the estimated width of the read element is acceptable.

17. The method of claim 16, wherein the positioning the read element to measure the amplitudes comprises:

moving the read element in incremental offsets away from a centerline of the data pattern toward a first edge of the data pattern to measure amplitudes on a first side of the data pattern between the centerline and a first edge of the data pattern; and moving the read element in incremental offsets away from the centerline toward a second edge of the data pattern to measure amplitudes on second side of the data pattern between the centerline and the second edge of the data pattern.

18. The method of claim 17, wherein the estimating the offset comprises estimating a first offset, wherein the offsets and amplitudes are processed by:

processing the offsets and the amplitudes gathered on the first side of the data pattern within a predefined range of the maximum amplitude to fit a first linear equation to the offsets and amplitudes, wherein the estimating the first offset at which the read element measures a fixed percentage of the maximum amplitude comprises using the first linear equation to estimate the first offset at the fixed percentage of the amplitude;

processing the offsets and the amplitudes gathered on the second side of the data pattern within the predefined range of the maximum amplitude to fit a second linear equation to the offsets and amplitudes; and using the second linear equation to estimate a second offset at the fixed percentage of the amplitude, wherein the width of the read element is estimated using the first and the second offsets.

19. The method of claim 16, wherein the data pattern comprises a first data pattern, the erase pattern a first erase pattern, the estimated width of the read element comprises a first width of the read element, further comprising:

writing, by the write element, a second data pattern and second erase pattern to the tape medium to provide the second erase pattern on sides of the second data pattern;

positioning the read element to measure amplitudes at offsets in the second data pattern; and processing the amplitudes and the offsets measured in the second data pattern to estimate a second width of the read element, wherein the outputting the estimated with comprises outputting the first width and the second width of the read element to use to determine whether the read element is acceptable.

20. The method of claim 19, wherein the first data pattern comprises an unshingled data pattern and wherein the second data pattern comprises a shingled data pattern.

* * * * *